United States Patent [19]

Nakajima

[11] Patent Number: 4,932,732
[45] Date of Patent: Jun. 12, 1990

[54] OPTICAL SCANNING APPARATUS
[75] Inventor: Tomohiro Nakajima, Matsudo, Japan
[73] Assignee: Ricoh Company, Ltd., Tokyo, Japan
[21] Appl. No.: 258,490
[22] Filed: Oct. 17, 1988
[30] Foreign Application Priority Data
   Oct. 22, 1987 [JP] Japan ................... 62-267315
[51] Int. Cl.$^5$ .................. G02B 26/10; G02B 3/06
[52] U.S. Cl. ............................ 350/6.3; 350/433
[58] Field of Search ............ 350/6.1, 6.2, 6.3, 6.4, 350/6.5, 433

[56]            References Cited
            U.S. PATENT DOCUMENTS
   3,700,911  10/1972  Wildhaber .................. 350/6.3
            FOREIGN PATENT DOCUMENTS
   0001149  1/1970  Japan ....................... 350/6.4
   0105104  6/1983  Japan ....................... 350/6.7
   242459   7/1986  Japan .
   156020  10/1986  Japan .

Primary Examiner—Bruce Y. Arnold
Assistant Examiner—Ronald M. Kachmarik
Attorney, Agent, or Firm—Cooper & Dunham

[57]              ABSTRACT

An optical scanning apparatus includes a light source and a polygon lens. The polygon lens consists of a plurality of cylindrical lenses. Each cylindrical lens has an inner concave surface and an outer concave surface. A light beam emitted from the light source passes through the inner concave surface without deflection, and then passes through the outer concave surface with some deflection. An angle of deflection is changed in accordance with rotation of the polygon mirror. The polygon mirror produces a scanning light beam which moves linearly.

18 Claims, 6 Drawing Sheets

OPTICAL SCANNING APPARATUS

BACKGROUND OF THE INVENTION

The present invention generally relates to an optical scanning apparatus, and particularly to a post-objective type optical scanning apparatus. The present invention more particularly relates to a post-objective type optical scanning apparatus which employs a polygon lens which functions as a rotary deflection mechanism.

Currently, an electrophotography printer and a hard copy machine are known. The electrophotography printer records an image on general paper, which is not specific paper such as developing paper. An optical printer, a digital copier and a facsimile machine are examples of the electrophotography printer. The hard copy machine records an electrically processed image on a film, developing paper or the like. These machines will be further developed to become more compact and economic. To attain such machines, it is necessary to reduce an optical scanning apparatus, or optical scanner in size. In the optical scanner, a modulated light beam is scanned directly on a storage medium or on an intermediate medium, so that an image is formed thereon.

Conventionally, most of optical scanners utilize a polygon mirror. An example of those is described with reference to FIG. 1. Referring to FIG. 1, a light source 1 is made up of a light-emitting part 2 constituted by a laser diode, and a collimator lens 3. A parallel light beam is extracted from the collimator lens 3. The parallel light beam passes through a cylindrical lens 4, and then enters an optical scanner 7. The optical scanner 7 includes a polygon mirror 6, which is driven by a scanner motor 5 so as to rotate in a direction of an arrow at a constant rotation speed. An incident light beam from the cylindrical lens 4 is reflected on the polygon mirror 6, and is changed to a scanning light beam represented by a solid line. The scanning light beam is refracted by an $F\theta$ lens 8, and then passes through a longitudinal cylindrical lens 9. Then the scanning light beam scans a photosensitive drum 10 in a direction of an arrow of a broken line. This direction is a main scanning direction. A broken line 11 denotes a scanning line on a peripheral surface of the photosensitive drum 10. A scanned portion of the photosensitive drum 10 is exposed. The photosentitive drum 10 is rotated by a main motor (not shown) in a direction of an arrow of a solid line. This direction is a sub-scanning direction. In this manner, an image is formed on the peripheral surface of the photosensitive drum 10.

The above-mentioned optical scanner employs a pre-object type optical system, in which the $f\theta$ lens 8 (an image-formation lens) is interposed between the optical scanner 7 and the photosensitive drum 10. The optical scanner 7 of FIG. 1 has an advantage that a scanning speed can be optically compensated by using the $f\theta$ lens 8. On the other hand, an $f\theta$ lens of a large size must be used, because the scanning light beam from the $f\theta$ lens 8 must scan the entire peripheral surface of the photosensitive drum 10 in the direction of the arrow. For this reason, it is difficult to fabricate a compact and economic optical scanner.

To reduce the above disadvantages, there has been proposed a post-objective type optical scanner (see the Japanese Laid-Open Patent Application Nos. 61-156020 and 61-242459). The disclosed post-objective type optical scanner employs, in place of the $f\theta$ lens, an image-formation lens positioned between a light source and an optical scanner. A conventional post-objective type optical scanner is shown in FIG. 2. In FIG. 2, those parts which are the same as those parts in FIG. 1, are given the same reference numerals.

Referring to FIG. 2, an image-formation lens 12 is positioned between the light source 1 and the optical scanner 7. The $f\theta$ lens 8 shown in FIG. 1 is removed. The image-formation lens 12 functions to form a spot of the parallel light beam on the peripheral surface of the photosensitive drum 10. The image-formation lens 12 may be constituted by an image formation lens having a smaller diameter, because the image-formation lens 12 handles the parallel beam which does not spread out widely. With the arrangement of FIG. 2, a compact and economic optical scanner may be fabricated.

However, the conventional post-objective type optical scanner has disadvantages described below. In the arrangement of FIG. 2, the focal length of the image-formation lens 12 is constant, and a distance between the image-formation lens 12 and a reflection point on the polygon mirror 6 is constant. Therefore, as shown in FIG. 3 (wherein the longitudinal cylindrical lens 9 is omitted for the sake of simplicity), a locus of the beam spot formed by the rotation of the polygon mirror 6 forms an arc. A center of the locus in the form of the arc is the reflection point 13 of the polygon mirror 6. The arc-shaped locus has a radius which corresponds to a distance between the reflection point 13 and the photosensitive drum 10. Therefore, curvature of an image-formation surface S arises. The curvature of the image-formation surface is not great in a vicinity of a center C of the projection plane which is the peripheral surface of the photosensitive drum 10. However, the larger an angle of deflection $\theta$, the longer a distance m between the projection plane and the image-formation surface S. As a result, the spot of the scanning light beam on the projection plane becomes blurred.

SUMMARY OF THE INVENTION

Accordingly, a general object of the present invention is to provide an optical scanning apparatus in which the above disadvantages are eliminated.

A more specific object of the present invention is to provide an optical scanning apparatus in which curvature of an image-formation surface is eliminated.

Another object of the present invention is to provide a more compact and economic optical scanning apparatus.

The above objects of the present invention are achieved by an optical scanning apparatus includes a light source portion for emitting a light beam, and a rotary deflection portion for subjecting the emitted light beam to rotary deflection to thereby produce a scanning light beam. The rotary deflection portion includes at least one cylindrical lens having an inner concave surface and an opposing outer concave surface. The light beam passes through the the inner concave surface without deflection, and then passes through the outer concave surface with deflection. The light beam obtained from the outer surface with deflection is the above scanning light beam which moves linearly in accordance with rotation of the rotary deflection means.

The above objects are also achieved by an optical scanning apparatus which includes a light source portion for emitting a light beam, and a rotary deflection portion for subjecting the emitted light beam to rotary deflection to thereby produce a scanning light beam. The rotary deflection portion includes a plurality of cylindrical lenses each having an inner concave surface and an opposing outer concave surface. The plurality of cylindrical lenses are arranged around a rotation axis of the rotary deflection portion at an equal interval of an angle. The light beam sequentially passes through the concave inner surfaces of the cylindrical lenses without deflection, and then passes through the corresponding concave outer surface with deflection. The light beam from the outer surface is the above scanning light beam which moves linearly in accordance with rotation of the rotary deflection means.

Other objects, features and advantages of the present invention will become apparent from the folowing detailed description when read in conjunction with the accompanying drawings.

DETAILED DESCRIPTION

A description is given of a preferred embodiment of the present invention.

Figure 4:
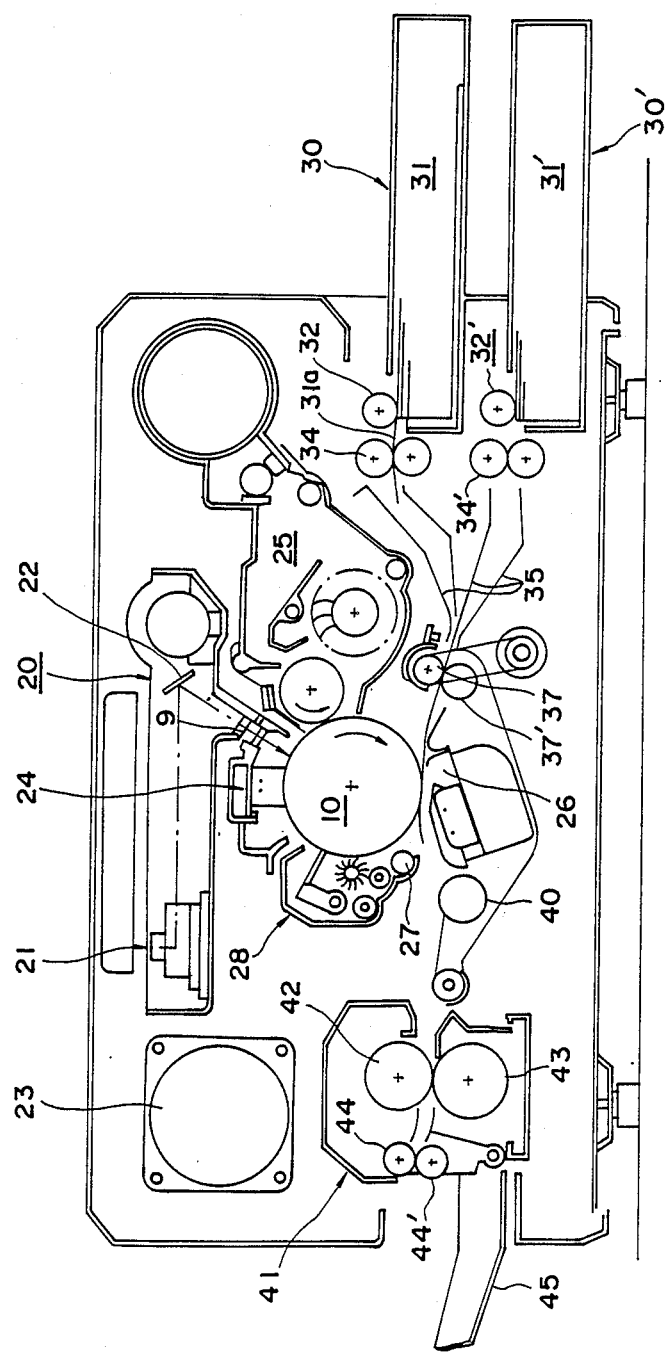
FIG. 4 is a side view of a laser printer, to which the present invention can be applied.

FIG. 4 illustrates a structure of a laser printer which employs an optical scanning apparatus provided by the present invention. In FIG. 4, those parts which are the same as those in the previous figures, are given the same reference numerals. A optical write unit 20 comprises an optical scanning apparatus 21, a mirror 22, and the longitudinal cylindrical lens 9. The optical write unit 20 emits a laser beam which has beam modulated by a write signal, and scans a peripheral surface of the photosensitive drum 10. Thereby, an image of a character, a picture and so on is written on the peripheral surface of the photosensitive drum 10. The photosensitive drum 10 starts rotating in response to a print signal, which is supplied from a control circuit built in the laser printer. The photosensitive drum 10 is rotated by a main motor 23 in a direction of rotation indicated by an arrow, and is successively electrified by a corona charger 24 during the rotation. The photosensitive drum 10 is then exposed by the light beam emitted from the optical write unit 20, and thereby a corresponding latent image is formed on the peripheral surface of the photosensitive drum 10. Then, the latent image thus formed is developed by a developer 25. The developed image is transferred to a sheet of paper by a transfer charger 26. Thereafter, a residual charge on the peripheral surface of the photosensitive drum 10 is removed due to light projection by a charge removing lamp 27. Finally, a toner remains on the peripheral surface of the photosensitive drum 10, is cleaned by a cleaning unit 28.

A plurality of sheets of paper are stacked in paper stackers (cassettes) 30 and 30'. A paper entrance roller 32 makes pressure contact with a front portion of a sheet of paper placed on top of the stacked sheets in the paper stacker 30. Similarly, a paper entrance roller 32 makes pressure contact with a front portion of sheet of paper placed on top of the stacked sheets in the paper stacker 30'. When either one of the paper stackers 30 and 30' is selected, the paper entrance roller associated with the selected paper stacker starts rotating. For example, when stacked sheets 31 are selected and thereby the paper entrance roller 32 starts rotating, a sheet of paper 31a out of the stacked sheets placed on top thereof is entered, and is then transported by a paper feed roller 34. The sheet 31a passes a guide path formed by a plurality of guide plates 35. Then when a front portion of the sheet 31a is brought into contact with a contact portion of a pair of resist rollers 37 and 37', and then sags, the transportation of the sheet 31a is temporarily stopped.

When the photosensitive drum 10 starts rotating in response to the print signal and then the exposure of the photosensitive drum 10 by the optical write unit 20 starts, the resist rollers 37 and 37' transport the sheet 31a at a speed equal to a rotation speed of the photosensitive drum 10 so that a first line is printed in a predetermined position on the sheet 31a.

When the sheet 31a is brought into contact with the photosensitive drum 10, the sheet 31a is electrified from the back side thereof by the transfer charger 26 so that the sheet 31a is electrified with a polarity opposite to the polarity of the photosensitive drum 10. A toner image formed on the peripheral surface of the photosensitive drum 10 is transferred to the sheet 31a. Then the sheet 31 on which the image has been formed, is sent to a fixing unit 41 by a transportation unit 40. Then the image formed on the sheet 31a is permanently fixed thereon by the cooperating function of a heat roller 42 and a fixing roller 43. The sheet thus obtained is ejected to an ejection tray 45 by the cooperating function of ejection rollers 44 and 44'.

Figure 1:
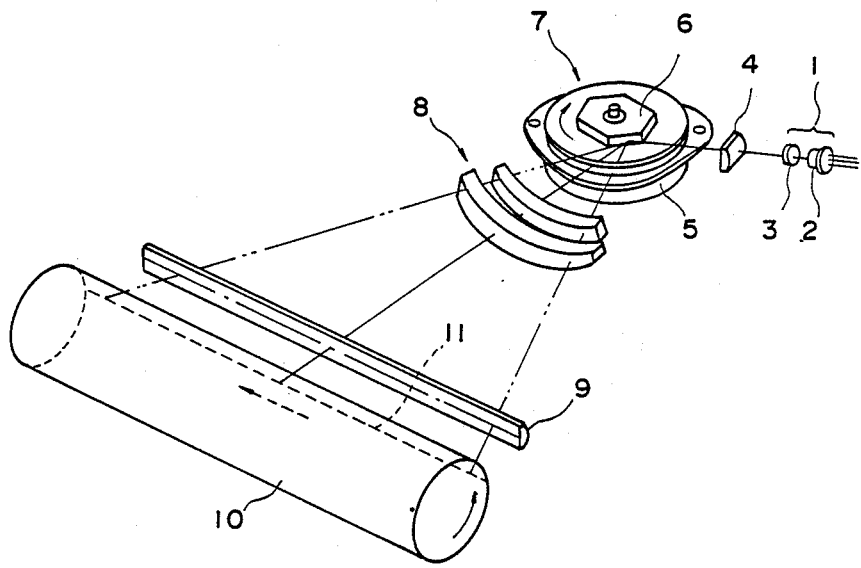
FIG. 1 is a perspective view of a conventional pre-object type optical scanner.
Figure 2:
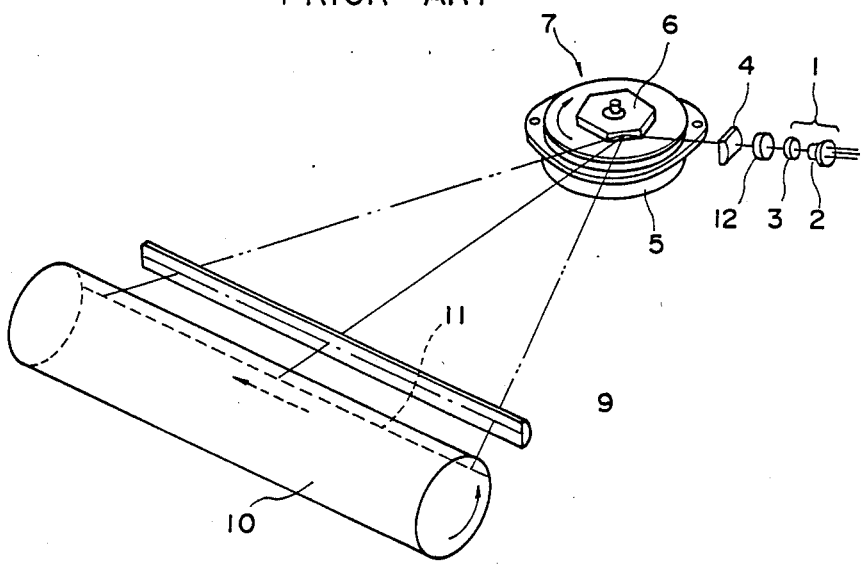
FIG. 2 is a perspective view of a conventional post-objective type optical scanner.
Figure 5:
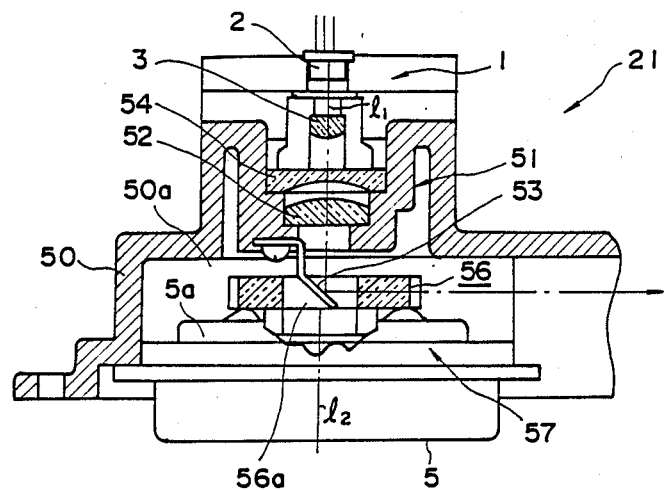
FIG. 5 is a sectional view of an optical scanning apparatus of a preferred embodiment of the present invention.
Figure 6:
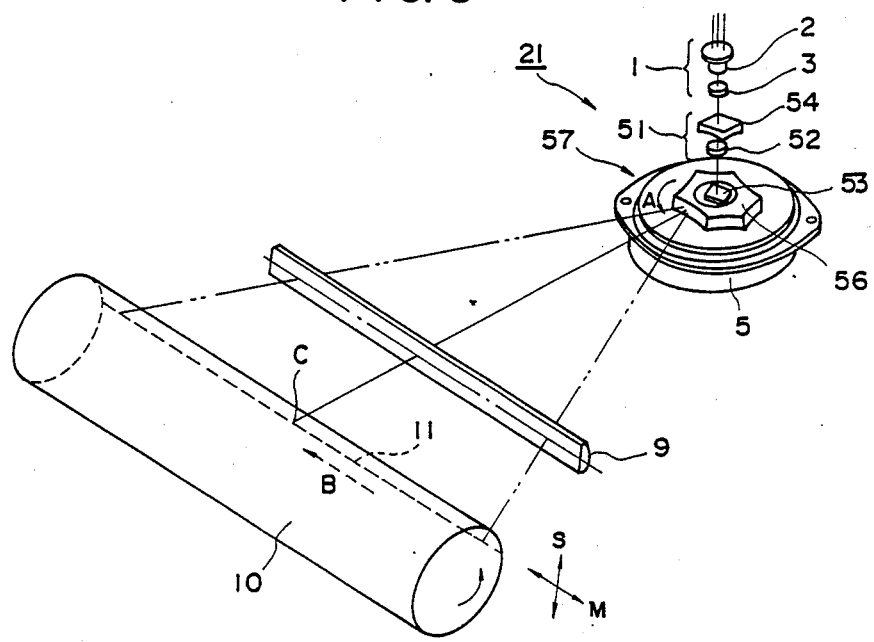
FIG. 6 is a perspective view showing the embodiment together with a longitudinal cylindrical lens and a photosensitive drum.

FIG. 5 shows an enlarged cross section of the optical scanning apparatus 21. FIG. 6 is a disassembled perspective view which shows a relationship between the optical scanning apparatus 21, the longitudinal cylindrical lens 9, and the photosensitive drum 10. In FIGS. 5 and 6, the same elements as those in FIGS. 1 and 2 are indicated by the same references.

The optical scanning apparatus 21 comprises the light source 1, an image-formation optical system 51, a mirror (a plan mirror) 53, and an optical scanner 57, all of which are accomodated into a case 50, as shown in FIG. 5. The light source 1 includes the light-emitting part 2 constituted by a laser diode, and the collimator lens 3. The image-formation optical system 51 comprises a negative cylindrical lens 54 and a positive image-formation lens 52, which have a common optical axis 1₁. The optical scanner 57 includes a polygonal cylindrical lens (hereinafter simply referred to as a polygon lens) 56, which is fixed to a rotary portion of the scanner motor 5. The polygon lens 56, which has a rotation axis $1_2$, functions as a rotary deflection member. The deflected light has power in the main scanning direction, which is orthogonal to the rotation axis $1_2$. The rotation axis $1_2$ of the polygon lens 56 is parallel to the optical axis $1_1$ of the light source 1 and the image-formation optical system 51, and slightly deviates from (almost coaxial with) the optical axis $1_1$. An end of the mirror 53 is fixed to an upper end portion of the case 50 which forms a hollow area 50a. A reflection surface of the mirror 53 is inclined at an angle of 45° with respect to the optical axis $1_1$.

As shown in FIG. 6, a meridional image surface (M) is defined as an image surface in the main scanning direction, and a sagittal image surface (S) is defined as an image surface in the sub-scanning direction.

A laser beam which is divergently emitted from the laser diode 2, is changed to a parallel beam by the collimator lens 3. Then the parallel beam enters the image-formation optical system 51. The cylindrical lens 54 has a negative power (divergence) in the sagittal direction, and has no power in the meridional direction. The image-formation lens 52 has a positive power (convergence). The light beam which is emitted from the image-formation optical system 51 has a large convergence property in the meridional direction, and a weak convergence property in the sagittal direction. The light beam emitted from the image-formation optical system 51 which has the above properties, is reflected on the mirror 53 at a right angle. The reflected light beam passes through the polygon lens 56. The light beam extracted from the polygon lens 56 functions as a scanning beam, which passes through the longitudinal cylindrical lens 9, and scans the peripheral surface of the photosensitive drum 10. A broken line indicated by a reference numeral 11 is a scanning line. In order that a spot of the laser beam from the cylindrical lens 9 is caused to move in a direction of an arrow B, the polygon lens 56 must rotate in a direction of rotation of an arrow A. It is noted that the direction of rotation A is opposite to the direction of rotation indicated by the solid line arrow shown in FIGS. 1 and 2.

Figure 7A:
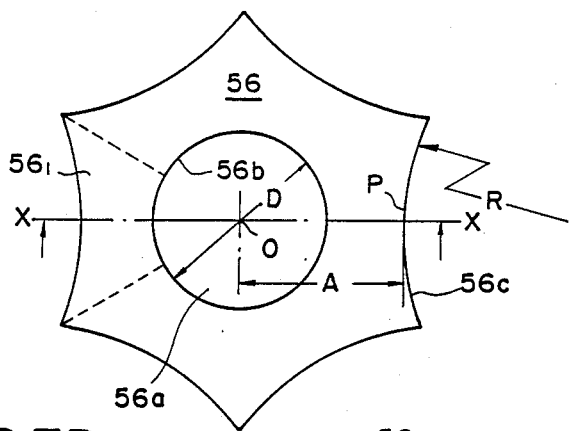
FIGS. 7A and 7B are plan and sectional views of a polygon lens employed in the embodiment, respectively.
Figure 7B:
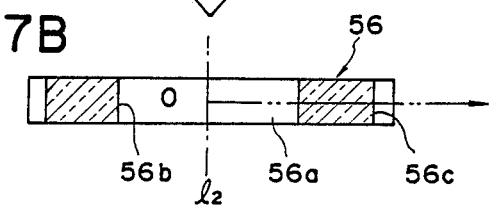

An example of the polygon lens 56 employed in the embodiment is illustrated in FIGS. 7A and 7B. A description is given of a principle of deflection of the light beam projected onto the polygon lens 56 with reference to FIG. 8.

The polygon lens 56 shown in FIGS. 7A and 7B consists of six unit cylindrical lens blocks. One of them is indicated by a reference numeral $56_1$. The six cylindrical lens blocks are integrally formed with an optically transparent substance such as glass, acrylic and polystyrene. Each cylindrical lens block has an inner surface 56b and an outer surface 56c. The inner surface having a concave arc (cylindrical) shape has a radius of curvature equal to D/2 where D denotes a diameter of the circle formed by the inner surface 56b. The outer surface 56c is a concave arc (cylindrical) surface having a radius equal to a radius of curvature R. Each of the cylindrical lens blocks has a negative power in the meridional direction (main scanning direction).

When the light beam passes through the polygon lens 56 in the radial direction from the center O thereof, the inner surface 56b has nothing to deflect the above light beam. This is because the polygon lens 56 has a cylindrical hollow area 56a having the diameter D at a center portion of the polygon lens 56. In other words, the light beam perpendicularly enters the inner surface 56b.

Figure 8:
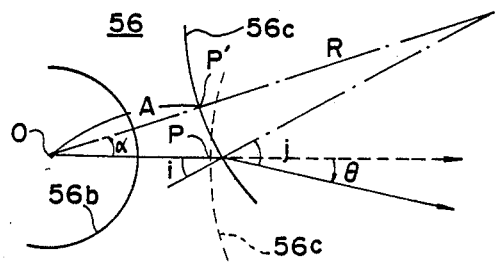
FIG. 8 is a view for explaining the principle of deflection of a light beam due to a function of the polygon lens.

In FIG. 8, when the outer surface 56c is positioned as shown by a broken line, or in other words, when the light beam passes through a point P on the outer surface 56c, the light beam is not deflected. The above position of the polygon lens 56 is defined as a reference position. Angles i, j and $\theta$ are angles obtained when the polygon lens 56 rotates counterclockwise with respect to the reference position, or in other words, the outer surface 56 becomes positioned as shown by a solid line. The angle i is an incident angle of the light beam with respect to the outer surface 56c, the angle j is an angle of reflection with respect to the outer surface 56c, and $\theta$ is an angle of deflection. It is further assumed that a distance A is a distance between the center of the polygon lens 56 and an point P' equivalent to the point P. The angle of deflection $\theta$ can be calculated by the following equation:

$$(\sin i)/(A+R) = (\sin \alpha)/R$$

$$\therefore \sin i = [(A+B)/R] \sin \alpha$$

$$\sin j = n \sin i$$

$$\theta = j - i$$

where n is a refractive index of the transparent substance which forms the polygon lens 56, and $\alpha$ is an angle of rotation of the polygon lens 56 with respect to the reference position. In a case where $(A+R)/R > 1$ and $n \approx 1.5$, $j > i$, and $\theta > 0$. Therefore, the angle of deflection $\theta$ has the opposite direction to the angle of rotation $\alpha$. That is, the scanning direction of the photosensitive drum 10 in the embodiment is opposite to the scanning direction in the case where the polygon mirror is used as shown in FIGS. 1 and 2.

As described before, both the inner and outer surfaces of each of the unit cylindrical lens blocks are concave surfaces. Therefore, each of the unit cylindrical lens blocks has zero power (no deflection) in the sagittal direction, and a relatively large negative power in the meridional direction.

As described previously, the light beam emitted from the image-formation optical system 51 has the strong convergence property (large positive power) in the meridional direction and the weak convergence property (weak positive power) in the sagittal direction. Therefore, the light beam extracted from the polygon lens 56 has no change of power in the sagittal direction, and has a weakened convergence property in the meridional direction. It is noted that the positive strong power of the light beam in the meridional direction is weakened due to the function of the large negative power of the polygon lens 56. As a result, the light beam forms a spot on the peripheral surface of the photosensitive drum 10.

The above mechanism is further described with reference to FIGS. 6, 8 and 9 in which the separate consideration is provided for the respective sagittal and meridional directions.

The convergence property of a sagittal luminous flux, which is a component of the light beam in the sagittal direction, is weakened due to the functions of the negative cylindrical lens 54 and the positive image-formation lens 52. Then the above sagittal luminous flux is converged and forms an image on the peripheral surface of the photosensitive drum 10 due to the function provided by the weak positive longitudinal cylindrical lens 9. The polygon lens 56 has nothing to affect the sagittal luminous flux. Therefore, the image-formation by the sagittal luminous flux has no relation with the deflection angle. In other words, the sagittal luminous flux does not contribute to determining the position of the spot on the scanning line 11.

On the other hand, the meridional luminous flux is strongly converged by the positive image-formation lens 52, and is then projected onto the polygon lens 56. When the polygon lens 56 is located at the reference position, or in other words, when the deflection angle $\theta$ is zero and the light beam is projected onto the center C on the peripheral surface of the photosensitive drum 10, the strong convergence property of the meridional luminous flux is changed to the weak convergence property due to the function of the negative power in the meridional direction of the polygon lens 56. Then, the meridional luminous flux is converged and forms an image at the center C.

When the polygon lens 56 rotates and then becomes located at the position indicated by the solid line of FIG. 8, the light beam obliquely enters the outer surface 56c having the radius R. In this state, the negative power of the polygon lens 56 is substantially increased, and therefore the convergence property is further weakened. As a result, an image-formation distance of the light beam having the further weakened convergence property, is lengthened. The image-formation distance is determined, depending on an absolute value of the angle of rotation $|\alpha|$. That is, a lengthened image-formation distance for the angle of rotation $+\alpha$ is identical to that for the angle of rotation $-\alpha$.

Figure 9:
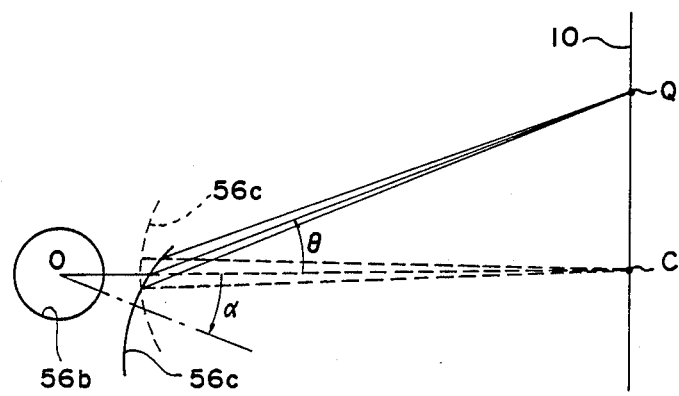
FIG. 9 is a view for explaining compensation of curvature of a meridional image surface.

FIG. 9 shows a function of compensating curvature of an image surface in the meridional direction (main scanning direction). In FIG. 9, the direction of rotation of the polygon lens 56 is negative (clockwise), or opposite to that for the case of FIG. 7A in order to facilitate comparison of FIGS. 3 and 9.

As the angle $\alpha$ of rotation (absolute value) increases, the angle of deflection $\theta$ increases, and therefore a position of the scanning light beam becomes away from the center C. During this operation, as the image-formation distance becomes larger, the position of the spot Q of the scanning light beam becomes closer to the peripheral surface of the photosensitive drum 10. That is, it become possible to correct curvature of the meridional image surface and place the spot Q on the scanning line 11 formed on the peripheral surface of the photosensitive drum 10, by selecting an appropriate radius of curvature R of the outer surface 56c of the polygon lens 56.

Figure 3:
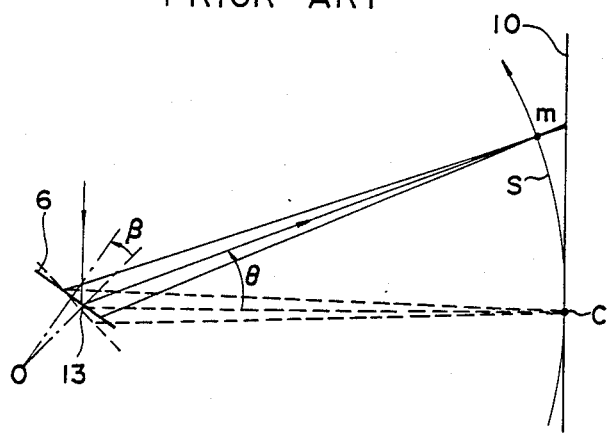
FIG. 3 is a view for explaining disadvantages of the optical scanner of FIG. 2.

In the post-objective type optical scanning apparatus which employs a polygon mirror as shown in FIG. 3, the image-formation surface is curved in the form of an arc. There is known another polygon mirror directed to reduce curvature of the image-formation surface. Such a polygon mirror has reflection surfaces which are not flat, but are slightly curved so as to form slightly concave reflection surfaces. However, the above polygon mirror has a disadvantage described below. When the polygon mirror rotates counterclockwise or clockwise by an angle $\beta$ with respect to a reference position where an incident light is irradiated onto the concave reflection surface at an angle of 45°, an angle of incidence of the light beam with respect to the concave reflection surface becomes equal to 45°±$\beta$. As a result, a quantity necessary to correct a curvature of the image-formation surface for an incident angle of 45°+$\beta$ is not identical to a quantity necessary to correct a curvature of the image-formation surface at an incident angle of 45°−$\beta$. For this reason, the polygon mirror having concave reflection surfaces cannot effectively correct curvature of the image-formation surface.

On the other hand, in the polygon lens of FIGS. 7A and 7B, a quantity necessary to correct a curvature of the image-formation surface for a positive angle with respect to the center C of the scanning line 11 is identical to a quantity necessary to correct a curvature of the image-formation surface for a negative angle with respect to the center C. Therefore, the effective correction of curvature of the image-formation surface is possible according to the present invention.

Further, the present invention does not require a high profile irregularity of the polygon lens 56, compared with that for the conventional polygon mirror 6. Generally, a ratio of the profile irregularity of a reflection surface to the profile irregularity of a refraction surface which affect power of a light beam, may be described as 2:(n−1). The ratio is equal to 4:1 where n is nearly equal to 1.5. That is, the profile irregularity of the refraction surface lens may be one quarter as large as the profile irregularity of the reflection surface. The polygon lens 56 has the inner and outer surfaces, and therefore the profile irregularity of the polygon lens 56 may be half of that for the polygon mirror 6. Therefore, the polygon lens 56 may be easily produced and the cost for production may be reduced, compared with the polygon mirror 6.

It should be appreciated that the light source 1 and the image-formation optical system 51 can be arranged so that the optical axis of the image-formation optical system 51 approximately coincides with the rotation axis $l_2$. Therefore, the optical scanning apparatus can be made greatly compact. As a result, the optical write unit 20 can be made compact.

It is noted that it is difficult to perfectly have the spot Q coincide with the scanning line 11 in the case where the outer surface 56c of the polygon lens 56 is the arc surface (cylindrical surface) having the same radius of curvature over the arc surface. On the other hand, the above problem can be eliminated by using a curved surface, in which the radius of curvature is equal to R at the center of teh curved surface, and is slightly varied at other portions of the curved surface. Such a curved surface (non-cylindrical surface) corresponds to an aspherical surface of a general lens. With the non-cylindrical surface of the polygon lens, it becomes possible to have the meridional image surface completely coincide with a surface including the scanning line on the peripheral surface of the photosensitive drum 10.

Figure 10A:
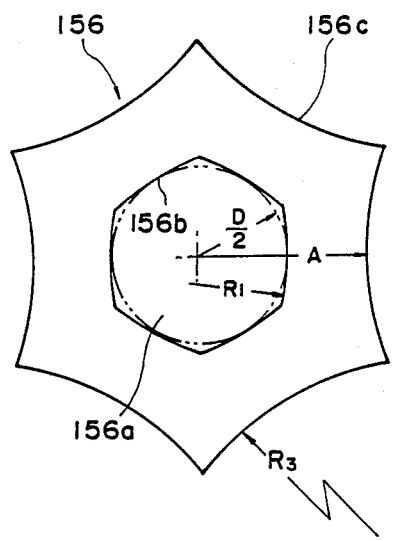
FIG. 10A is a plan view showing another polygon lens according to the present invention.

Another polygon lens provided by the present invention is illustrated in FIG. 10A. A polygon lens 156 has inner and outer surfaces 156b and 156c. The inner surface 156b has an inscribed circle represented by a two-dotted chain line which has a radius D/2. The radius of curvature R1 of the inner surface 156b is larger than the radius D/2. The radius of curvature R3 of the outer surface 156c may be equal to or different from the radius of curvature R1 of the polygon lens 56.

Figure 10B:
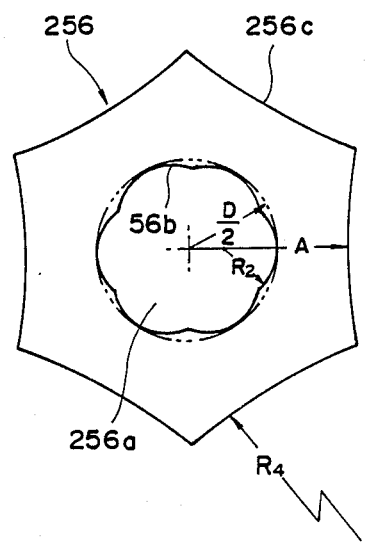
FIG. 10B is a plan view showing yet another polygon lens according to the present invention.

A yet another polygon lens provided by the present invention is illustrated in FIG. 10B. A polygon lens 256 has inner and outer surfaces 256b and 256c. The inner surface 256b has a circumscribed circle shown by a two-dotted chain line which has the radius D/2. The radius of curvature R2 of the inner surface is smaller than the radius D/2. The radius of curvature R4 of the outer surface 256c may be equal to or different from the radius of the curvature R1 of the polygon lens 56.

The polygon lenses 156 and 256 shown in FIGS. 10A and 10B can increase the degree of flexibility in correction of curvature of the image-formation surface.

The aforementioned polygon lenses are constructed by respective six cylindrical lens blocks. However, the polygon lens provided by the present invention is not limited to such structures. Further, a plurality of cylindrical lens blocks may be arranged around the rotation axis at an interval of an equal angle. Moreover, a single cylindrical lens block may be used in a case when the scan is intermittently carried out.

Figure 11:
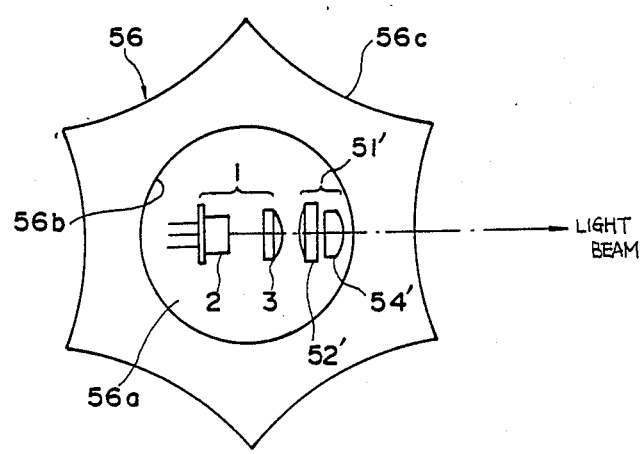
FIG. 11 is a plan view showing another embodiment of the present invention.

A description is given of another embodiment of the optical scanning apparatus provided by the present invention with reference to FIG. 11. Those parts which are the same as those in the previous figures, are given the same reference numerals.

Referring to FIG. 11, the light source 1, and an image-formation optical system 51' are accommodated into the hollow portion 56a of the polygon lens 56 so that the optical axis of the light source 1 coincides with the optical axis of the image-formation optical system 51' and that those axes are perpendicular to the rotation axis of the polygon lens 56. The light source 1 comprises the light-emitting part 2 constituted by the laser diode, and the collimator lens 3. The image-formation optical system 51' comprises a weak positive image-formation lens 52' and a cylindrical lens 54' having a large positive power. The cylindrical lens 54' is positioned so that the positive power of the cylindrical lens 54' is directed to the meridional direction. Therefore, the cylindrical lens 64' functions to cancel the negative power of the polygon lens 56 in the meridional direction. As a result, the optical system can be constructed by elements having smaller power, and design and fabrication of the optical scanning apparatus may be facilitated. Additionally, the arrangement of FIG. 11 enables the optical scanning apparatus to be reduced in thickness.

The liner velocity measured when the spot Q scans the scanning line 11 is proportional to a product of an angle of tan $\theta$ and an angular velocity of deflection. The polygon lens 56 rotates at the constant speed. Therefore, the scanning line speed of the spot Q is not constant, and is faster in an end portion of the scanning line 11 than the scanning line speed in a vicinity of the center C. The ununiformity of the scanning line speed causes an ununiformity of a dot interval (pixel) on the scanning line 11, or deformation of an image, as well as an ununiformity of exposure quantity, or an ununiformity in tone. As a result, the quality of an image may be degraded. This probability can be decreased. The scanning line speed and angle at which the light beam is projected onto the peripheral surface of the photosensitive drum 10, are obtained by calculation. Therefore, the deformation of the image can be compensated by altering a pixel clock frequency, depending on a position of a dot on the scanning line so that every dot interval becomes equal. The ununiformity of tone can be compensated by controlling the light-emission quality of a light-emitting device such as a laser diode, depending on a position of a dot so that uniform tone is obtained over the scanning line.

The present invention is not limited to the above embodiments, and variations and modifications may be made without departing from the scope of the present invention.

What is claimed is:

1. An optical scanning apparatus comprising:
light source means for emitting a light beam;
an image-formation optical system converting said light beam into a light beam having a positive power in a predetermined direction; and
rotary deflection means for subjecting the light beam from said image-formation optical system to rotary deflection to thereby produce a scanning light beam;
the rotary deflection means comprising at least one cylindrical lens having a negative power in said predetermined direction and having an inner concave surface and an opposing outer concave surface, the light beam passing through the inner concave surface without deflection and then passing through the outer concave surface with deflection, the light beam obtained from the outer surface with deflection forming a uniform spot in said predetermined direction which moves linearly in accordance with rotation of the rotary deflection means.

2. An optical scanning apparatus as claimed in claim 1, wherein the inner and outer concave surfaces of the cylindrical lens have respective constant radii of curvature.

3. An optical scanning apparatus as claimed in claim 1, wherein the outer concave surface has different radii of curvature at different points of the outer concave surface.

4. An optical scanning apparatus comprising:
light source means for emitting a light beam;
an image-formation optical system converting said light beam into a light beam having a positive power in a predetermined direction; and
rotary deflection means for subjecting the light beam from said image-formation optical system to rotary deflection to thereby produce a scanning light beam;
the rotary deflection means comprising a plurality of cylindrical lenses each having a negative power in said predetermined direction and having an inner concave surface and an opposing outer concave surface, the plurality of cylindrical lenses being arranged around a rotation axis of the rotary deflection means at an interval of an equal angle, the light beam sequentially passing through the inner concave surfaces of the cylindrical lenses without deflection and then passing through the corresponding concave outer surfaces with deflection, the light beam from the outer surface forming a uniform spot in said predetermined direction which moves linearly in accordance with rotation of the rotary deflection means.

5. An optical scanning apparatus as claimed in claim 4, wherein neighboring cylindrical lenses out of the plurality of cylindrical lenses are in contact with each other, so that a polygon lens having a hollow area at a center portion is formed.

6. An optical scanning apparatus as claimed in claim 5, wherein the plurality of cylindrical lenses are integrally formed with an optically transparent substance.

7. An optical scanning apparatus as claimed in claim 6, wherein the radius of curvature of each of the inner concave surfaces is constant at every point on the inner concave surface.

8. An optical scanning apparatus as claimed in claim 6, wherein the outer concave surfaces have the same radius of curvature.

9. An optical scanning apparatus as claimed in claim 5, wherein the light source means comprises light-emitting means for emitting a laser beam, a collimator lens for changing the laser beam to a parallel light beam, an image-formation optical system for converging a luminous flux of the parallel light beam in the linear scanning direction, and a mirror on which the parallel light beam from the image-formation optical system is reflected to be sent to the rotary deflection means, and wherein the rotary deflection means further comprises a motor which rotates the polygon lens.

10. An optical scanning apparatus as claimed in claim 9, wherein the image-formation optical system comprises a cylindrical lens and an image-formation lens having a positive power.

11. An optical scanning apparatus as claimed in claim 9, wherein the light source means is positioned above the hollow area, and the light beam reflected on the mirror is sequentially irradiated onto the inner surfaces of the cylindrical lenses which are in rotation.

12. An optical scanning apparatus as claimed in claim 9, wherein the light source means is arranged on the rotation axis of the polygon mirror, and wherein the mirror is positioned in the hollow area of the polygon mirror at an angle of 45° with respect to the rotation axis.

13. An optical scanning apparatus as claimed in claim 5, wherein the light source means is accommodated into the hollow area of the polygon lens.

14. An optical scanning apparatus as claimed in claim 4, wherein the inner concave surfaces have the same radius of curvature.

15. An optical scanning apparatus as claimed in claim 4, wherein each of the cylindrical lenses which form the polygon mirror has a negative power which functions to diverge the light beam in the linear scanning direction, and has no power in a direction perpendicular to the main scanning direction.

16. An optical scanning apparatus as claimed in claim 4, further comprising a case which accommodates the light source means and the rotary deflection means.

17. An optical scanning apparatus comprising:
light source means for emitting a light beam;
an image-formation optical system converting said light beam into a light beam having a positive power in a predetermined direction; and
rotary deflection means for subjecting the light beam from said image-formation optical system to rotary deflection to thereby produce a scanning light beam;
the rotary deflection means comprising a plurality of cylindrical lenses each having a negative power in said predetermined direction and having an inner concave surface and an opposing outer concave surface, the plurality of cylindrical lenses being arranged around a rotation axis of the rotary deflection means at an interval of an equal angle, the light beam sequentially passing through the inner concave surfaces of the cylindrical lenses with deflection and then passing through the corresponding concave outer surfaces with deflection, the light beam from the outer surface forming a uniform spot in said predetermined direction which moves linearly in accordance with rotation of the rotary deflection means,
wherein:
neighboring cylindrical lenses out of the plurality of cylindrical lenses are in contact with each other so that a polygon lens having a hollow area at a center portion is formed, and
an inner surface of the polygon lens which is formed by the inner surfaces of the cylindrical lenses has a radius of curvature larger than a radius of an imaginary inscribed circle of the inner surface of the polygon lens.

18. An optical scanning apparatus comprising:
light source means for emitting a light beam;
an image-formation optical system converting said light beam into a light beam having a positive power in a predetermined direction; and
rotary deflection means for subjecting the light beam from said image-formation optical system to rotary deflection to thereby produce a scanning light beam;
the rotary deflection means comprising a plurality of cylindrical lenses each having a negative power in said predetermined direction and having an inner concave surface and an opposing outer concave surface, the plurality of cylindrical lenses being arranged around a rotation axis of the rotary deflection means at an interval of an equal angle, the light beam sequentially passing through the inner concave surfaces of the cylindrical lenses with deflection and then passing through the corresponding concave outer surfaces with deflection, the light beam from the outer surface forming a uniform spot in said predetermined direction which moves linearly in accordance with rotation of the rotary deflection means,
wherein:
neighboring cylindrical lenses out of the plurality of cylindrical lenses are in contact with each other so that a polygon lens having a hollow area at a center portion is formed, and
an inner surface of the polygon lens which is formed by the inner surfaces of the cylindrical lenses has a radius of curvature larger than a radius of an imaginary circumscribed circle of the inner surface of the polygon lens.

* * * * *